(12) United States Patent
Schwartz

(10) Patent No.: US 11,847,589 B2
(45) Date of Patent: Dec. 19, 2023

(54) VIRTUAL QUEUING SYSTEM AND METHOD

(71) Applicant: Universal City Studios LLC, Universal City, CA (US)

(72) Inventor: Justin Michael Schwartz, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/385,391

(22) Filed: Jul. 26, 2021

(65) Prior Publication Data

US 2021/0350292 A1 Nov. 11, 2021

Related U.S. Application Data

(63) Continuation of application No. 14/829,227, filed on Aug. 18, 2015, now abandoned.

(60) Provisional application No. 62/039,609, filed on Aug. 20, 2014.

(51) Int. Cl.
*G06Q 10/02* (2012.01)
*G07C 11/00* (2006.01)

(52) U.S. Cl.
CPC ............. *G06Q 10/02* (2013.01); *G07C 11/00* (2013.01); *G07C 2011/02* (2013.01); *G07C 2011/04* (2013.01)

(58) Field of Classification Search
CPC ...................................................... G06Q 10/02
See application file for complete search history.

(56) References Cited

U.S. PATENT DOCUMENTS

| 5,502,806 | A | 3/1996 | Mahoney et al. |
| 5,566,327 | A | 10/1996 | Sehr |
| 5,694,514 | A | 12/1997 | Evans et al. |
| 5,946,444 | A | 8/1999 | Evans et al. |
| 5,978,770 | A | 11/1999 | Waytena et al. |
| 5,987,420 | A | 11/1999 | Maeda et al. |
| 5,987,421 | A | 11/1999 | Chuang |

(Continued)

FOREIGN PATENT DOCUMENTS

| CN | 101498586 A | 8/2009 |
| CN | 101833698 A | 9/2010 |

(Continued)

OTHER PUBLICATIONS

Chu, Liou, Lin Hui, and Fu-Yi Hung. "Simulation of theme park queuing system by using arena." 2013 Ninth International Conference on Intelligent Information Hiding and Multimedia Signal Processing. IEEE, 2013. (Year: 2013).*

(Continued)

*Primary Examiner* — Emmett K. Walsh
(74) *Attorney, Agent, or Firm* — Fletcher Yoder P.C.

(57) ABSTRACT

A system in accordance with present embodiments includes a plurality of virtual queuing stations associated with respective attractions within a theme park and a virtual queue control system configured to maintain respective virtual queues for the respective attractions and in communication with the plurality of virtual queuing stations. The virtual queue control system is configured to receive communications from the plurality of virtual queuing stations and add guests to the respective virtual queues based on the communications.

13 Claims, 4 Drawing Sheets

(56) References Cited

U.S. PATENT DOCUMENTS

| | | | |
|---|---|---|---|
| 6,078,928 A | 6/2000 | Schnase et al. |
| 6,142,368 A | 11/2000 | Mullins et al. |
| 6,173,209 B1 | 1/2001 | Laval et al. |
| 6,259,786 B1 | 7/2001 | Gisby |
| 6,307,952 B1 | 10/2001 | Dietz |
| 6,424,623 B1 | 7/2002 | Borgstahl et al. |
| 6,526,158 B1 | 2/2003 | Goldberg |
| 6,529,786 B1 | 3/2003 | Sim |
| 6,535,376 B2 | 3/2003 | Fujita et al. |
| 6,628,899 B1 | 9/2003 | Kito |
| 6,629,019 B2 | 9/2003 | Legge et al. |
| 6,748,364 B1 | 6/2004 | Waytena et al. |
| 6,785,539 B2 | 8/2004 | Hale et al. |
| 6,813,608 B1 | 11/2004 | Baranowski |
| 6,819,759 B1 | 11/2004 | Khuc et al. |
| 6,845,361 B1 | 1/2005 | Dowling |
| 6,873,260 B2 | 3/2005 | Lancos et al. |
| 6,889,098 B1 | 5/2005 | Laval et al. |
| 6,889,900 B2 | 5/2005 | Davies et al. |
| 6,937,998 B1 | 8/2005 | Swartz et al. |
| 7,029,400 B2 | 4/2006 | Briggs |
| 7,047,205 B2 | 5/2006 | Hale et al. |
| 7,136,822 B2 | 11/2006 | Kimura et al. |
| 7,188,767 B2 | 3/2007 | Penuela et al. |
| 7,204,425 B2 | 4/2007 | Mosher, Jr. et al. |
| 7,212,983 B2 | 5/2007 | Redmann et al. |
| 7,222,080 B2 | 5/2007 | Hale et al. |
| 7,224,967 B2 | 5/2007 | Hale et al. |
| 7,327,251 B2 | 2/2008 | Corbett, Jr. |
| 7,366,512 B1 | 4/2008 | Kefalas et al. |
| 7,400,932 B2 | 7/2008 | Ackley et al. |
| 7,430,411 B2 | 9/2008 | Sengupta et al. |
| 7,496,445 B2 | 2/2009 | Mohsini et al. |
| 7,505,474 B2 | 3/2009 | Walter |
| 7,516,148 B2 | 4/2009 | Waytena et al. |
| 7,532,941 B2 | 5/2009 | Hale et al. |
| 7,541,926 B2 | 6/2009 | Dugan et al. |
| 7,603,321 B2 | 10/2009 | Gurvey |
| 7,642,921 B2 | 1/2010 | Cutler et al. |
| 7,674,184 B2 | 3/2010 | Briggs et al. |
| 7,685,009 B2 | 3/2010 | Halavais et al. |
| 7,685,014 B2 | 3/2010 | Dean |
| 7,706,904 B2 | 4/2010 | Jones et al. |
| 7,720,718 B2 | 5/2010 | Hale et al. |
| 7,729,382 B2 | 6/2010 | Rosner et al. |
| 7,739,925 B2 | 6/2010 | Foster |
| 7,752,146 B2 | 7/2010 | Lert, Jr. |
| 7,756,745 B2 | 7/2010 | Leet et al. |
| 7,775,894 B2 | 8/2010 | Henry et al. |
| 7,778,937 B2 | 8/2010 | Ferrara et al. |
| 7,787,965 B2 | 8/2010 | Hale et al. |
| 7,788,215 B2 | 8/2010 | Trowbridge et al. |
| 7,793,109 B2 | 9/2010 | Ortiz |
| 7,801,629 B2 | 9/2010 | Hale et al. |
| 7,801,752 B2 | 9/2010 | Neulight |
| 7,802,724 B1 | 9/2010 | Nohr |
| 7,817,990 B2 | 10/2010 | Pamminger et al. |
| 7,826,966 B2 | 11/2010 | Little et al. |
| 7,837,567 B2 | 11/2010 | Holzberg et al. |
| 7,881,713 B2 | 2/2011 | Hale et al. |
| 7,885,763 B2 | 2/2011 | Havens |
| 7,895,066 B2 | 2/2011 | Waytena et al. |
| 7,921,297 B2 | 4/2011 | Ortiz et al. |
| 7,942,320 B2 | 5/2011 | Joe |
| 7,966,215 B1 | 6/2011 | Myers et al. |
| 7,994,910 B2 | 8/2011 | Brooks et al. |
| 8,016,667 B2 | 9/2011 | Benbrahim |
| 8,082,165 B2 | 12/2011 | Natsuyana et al. |
| 8,126,782 B1 | 2/2012 | Zhu et al. |
| 8,200,515 B2 | 6/2012 | Natsuyama et al. |
| 8,226,493 B2 | 7/2012 | Briggs et al. |
| 8,231,047 B2 | 7/2012 | Canora |
| 8,253,533 B2 | 8/2012 | Jones |
| 8,253,542 B2 | 8/2012 | Canora et al. |
| 8,275,767 B2 | 9/2012 | Shepherd et al. |
| 8,284,924 B2 | 10/2012 | Dube et al. |
| 8,294,549 B2 | 10/2012 | Samovar et al. |
| 8,296,983 B2 | 10/2012 | Padgett et al. |
| 8,313,381 B2 | 11/2012 | Ackley et al. |
| 8,330,587 B2 | 12/2012 | Kupstas |
| 8,333,321 B2 | 12/2012 | Gressel et al. |
| 8,396,001 B2 | 3/2013 | Jung et al. |
| 8,396,727 B2 | 3/2013 | Waytena et al. |
| 8,401,334 B2 | 3/2013 | Neville et al. |
| 8,416,087 B2 | 4/2013 | Canora et al. |
| 8,424,716 B2 | 4/2013 | Hegan et al. |
| 8,425,314 B2 | 4/2013 | Benbrahim |
| 8,430,749 B2 | 4/2013 | Nelson et al. |
| 8,452,708 B1 | 5/2013 | Birenbaum et al. |
| 8,453,926 B2 | 6/2013 | Hunt |
| 8,462,994 B2 | 6/2013 | Ortiz et al. |
| 8,489,451 B2 | 7/2013 | Ramchandani |
| 8,489,657 B2 | 7/2013 | Shepherd et al. |
| 8,498,900 B1 | 7/2013 | Spirin et al. |
| 8,500,031 B2 | 8/2013 | Naelon |
| 8,510,136 B2 | 8/2013 | Charania et al. |
| 8,510,163 B2 | 8/2013 | Hess et al. |
| 8,565,735 B2 | 10/2013 | Wohlwend et al. |
| 8,577,734 B2 | 11/2013 | Treyz et al. |
| 8,581,721 B2 | 11/2013 | Asher et al. |
| 8,608,548 B2 | 12/2013 | Mattice et al. |
| 8,612,278 B1 | 12/2013 | Ashley, Jr. et al. |
| 8,616,984 B2 | 12/2013 | Mattice et al. |
| 8,618,935 B2 | 12/2013 | Felt et al. |
| 8,654,965 B2 | 2/2014 | Dube et al. |
| 8,700,005 B1 | 4/2014 | Kiraly et al. |
| 8,731,997 B2 | 5/2014 | Corbett et al. |
| 8,732,101 B1 | 5/2014 | Wilson et al. |
| 8,750,576 B2 | 6/2014 | Huang et al. |
| 8,750,784 B2 | 6/2014 | Ortiz et al. |
| 8,751,472 B2 | 6/2014 | Mei et al. |
| 8,762,101 B2 | 6/2014 | Yuen et al. |
| 8,773,245 B2 | 7/2014 | Canora et al. |
| 8,774,839 B2 | 7/2014 | Busch |
| 8,775,244 B2 | 7/2014 | Boss et al. |
| 8,793,314 B2 | 7/2014 | Spivak et al. |
| 8,798,643 B1 | 8/2014 | Boyle et al. |
| 8,803,366 B2 | 8/2014 | Proud |
| 8,810,430 B2 | 8/2014 | Proud |
| 8,821,238 B2 | 9/2014 | Ackley et al. |
| 8,827,810 B2 | 9/2014 | Weston et al. |
| 8,830,030 B2 | 9/2014 | Arthurs et al. |
| 8,831,963 B2 | 9/2014 | Backer et al. |
| 8,851,372 B2 | 10/2014 | Zhou et al. |
| 8,866,673 B2 | 10/2014 | Mendelson |
| 8,870,641 B2 | 10/2014 | Dabrowskiqqq |
| 8,879,440 B2 | 11/2014 | Guo et al. |
| 8,896,485 B2 | 11/2014 | Mendelson |
| 8,897,808 B2 | 11/2014 | Farris |
| 8,913,011 B2 | 12/2014 | Barney et al. |
| 8,924,432 B2 | 12/2014 | Richards et al. |
| 8,948,541 B2 | 2/2015 | Neville et al. |
| 8,949,146 B2 | 2/2015 | Fisher |
| 8,954,091 B1 | 2/2015 | Boyle et al. |
| 8,972,048 B2 | 3/2015 | Canora et al. |
| 8,979,646 B2 | 3/2015 | Moser et al. |
| 8,989,779 B1 | 3/2015 | Centore, III |
| 9,002,736 B2 | 4/2015 | Wohlwend et al. |
| 9,138,650 B2 | 9/2015 | Barney et al. |
| 9,149,717 B2 | 10/2015 | Barney et al. |
| 9,162,148 B2 | 10/2015 | Barney et al. |
| 2002/0007292 A1* | 1/2002 | Paxton .................. G07C 11/00 705/6 |
| 2002/0046068 A1 | 4/2002 | Koh |
| 2002/0070865 A1 | 6/2002 | Lancos et al. |
| 2002/0082897 A1 | 6/2002 | Menelly et al. |
| 2002/0099576 A1 | 7/2002 | MacDonald et al. |
| 2002/0116233 A1 | 8/2002 | Kuge et al. |
| 2002/0116235 A1 | 8/2002 | Grimm et al. |
| 2002/0174003 A1 | 11/2002 | Redmann et al. |
| 2003/0030561 A1 | 2/2003 | Yafuso et al. |
| 2003/0041105 A1 | 2/2003 | Patrick |
| 2003/0093167 A1 | 5/2003 | Sim |
| 2003/0102956 A1 | 6/2003 | McManus et al. |

(56) References Cited

U.S. PATENT DOCUMENTS

| | | |
|---|---|---|
| 2003/0195760 A1 | 10/2003 | Kim et al. |
| 2004/0006497 A1 | 1/2004 | Nestor et al. |
| 2004/0059614 A1 | 3/2004 | Brown et al. |
| 2004/0100390 A1 | 5/2004 | Giraldin et al. |
| 2004/0117219 A1 | 6/2004 | Sugimoto et al. |
| 2004/0117528 A1 | 6/2004 | Beacher et al. |
| 2004/0158482 A1 | 8/2004 | Hale et al. |
| 2004/0172316 A1 | 9/2004 | Hale et al. |
| 2004/0225540 A1 | 11/2004 | Waytena et al. |
| 2005/0045710 A1 | 3/2005 | Burke |
| 2005/0060173 A1 | 3/2005 | Hale et al. |
| 2005/0070258 A1 | 3/2005 | Stanco |
| 2005/0080675 A1 | 4/2005 | Lovegreen et al. |
| 2005/0093986 A1* | 5/2005 | Shinohara .......... G06Q 30/0603 348/208.1 |
| 2005/0168340 A1 | 8/2005 | Mosher, Jr. et al. |
| 2005/0198107 A1 | 9/2005 | Cuhls et al. |
| 2005/0200455 A1 | 9/2005 | Veni, III et al. |
| 2005/0240453 A1 | 10/2005 | Lyons |
| 2005/0256724 A1* | 11/2005 | Rasin .................. G06Q 50/265 705/325 |
| 2005/0278215 A1 | 12/2005 | Seele, Jr. |
| 2006/0002413 A1 | 1/2006 | Tsutazawa et al. |
| 2006/0068787 A1 | 3/2006 | Deshpande et al. |
| 2006/0100985 A1 | 5/2006 | Mark et al. |
| 2006/0147005 A1 | 7/2006 | Taub |
| 2006/0273920 A1 | 12/2006 | Doan et al. |
| 2007/0042748 A1 | 2/2007 | Macarthur |
| 2007/0064904 A1 | 3/2007 | Wesley |
| 2007/0088701 A1 | 4/2007 | Rao |
| 2007/0130313 A1 | 6/2007 | King |
| 2007/0156846 A1 | 7/2007 | Seward |
| 2007/0168390 A1 | 7/2007 | Mardirossian |
| 2007/0174042 A1 | 7/2007 | Thompson |
| 2007/0203763 A1 | 8/2007 | Ackley et al. |
| 2007/0225911 A1 | 9/2007 | Chanick |
| 2007/0233291 A1 | 10/2007 | Herde et al. |
| 2007/0244731 A1 | 10/2007 | Bayhydt et al. |
| 2007/0286220 A1 | 12/2007 | Stenning |
| 2008/0022089 A1 | 1/2008 | Leedom |
| 2008/0040172 A1 | 2/2008 | Watkins |
| 2008/0055051 A1 | 3/2008 | Snyder et al. |
| 2008/0071587 A1 | 3/2008 | Granucci et al. |
| 2008/0080445 A1 | 4/2008 | Bayne et al. |
| 2008/0086377 A1 | 4/2008 | Jain |
| 2008/0129487 A1 | 6/2008 | Crucs |
| 2008/0133283 A1 | 6/2008 | Backer et al. |
| 2008/0197984 A1 | 8/2008 | Peters et al. |
| 2008/0201227 A1 | 8/2008 | Bakewell et al. |
| 2008/0215385 A1 | 9/2008 | Veitch |
| 2008/0220871 A1 | 9/2008 | Asher et al. |
| 2008/0246592 A1 | 10/2008 | Waalkes et al. |
| 2008/0267107 A1 | 10/2008 | Rosenberg |
| 2008/0270230 A1 | 10/2008 | Hendrickson et al. |
| 2008/0270305 A1 | 10/2008 | Andreasson et al. |
| 2008/0275630 A1 | 11/2008 | Regienczuk |
| 2008/0301264 A1 | 12/2008 | Mathai et al. |
| 2008/0319935 A1 | 12/2008 | Chandak |
| 2008/0319992 A1 | 12/2008 | Mathai et al. |
| 2009/0063205 A1 | 3/2009 | Shibasaki |
| 2009/0104874 A1 | 4/2009 | Ellis |
| 2009/0112638 A1 | 4/2009 | Kneller et al. |
| 2009/0116235 A1 | 5/2009 | Tsao et al. |
| 2009/0204449 A1 | 8/2009 | Waytena et al. |
| 2009/0216547 A1 | 8/2009 | Canora et al. |
| 2009/0222291 A1 | 9/2009 | Montavon et al. |
| 2009/0259556 A1 | 10/2009 | Carroll et al. |
| 2009/0267728 A1 | 10/2009 | Mayrand |
| 2009/0276341 A1 | 11/2009 | McMahan et al. |
| 2009/0281903 A1 | 11/2009 | Blatstein |
| 2009/0286559 A1 | 11/2009 | Janas et al. |
| 2009/0313062 A1 | 12/2009 | Natsuyama et al. |
| 2009/0319306 A1 | 12/2009 | Chanick |
| 2010/0017238 A1 | 1/2010 | Johnson et al. |
| 2010/0017725 A1 | 1/2010 | McCarthy et al. |
| 2010/0062838 A1 | 3/2010 | Nguyen et al. |
| 2010/0063854 A1 | 3/2010 | Purvis et al. |
| 2010/0111377 A1 | 5/2010 | Monroe |
| 2010/0114968 A1 | 5/2010 | Dean |
| 2010/0161432 A1 | 6/2010 | Kumanov et al. |
| 2010/0250612 A1 | 9/2010 | Reuveni et al. |
| 2010/0262507 A1 | 10/2010 | Woycik et al. |
| 2010/0308964 A1 | 12/2010 | Ackley et al. |
| 2010/0317377 A1 | 12/2010 | Zou et al. |
| 2010/0321149 A1 | 12/2010 | Foster |
| 2010/0328025 A1 | 12/2010 | Razdan |
| 2011/0022425 A1 | 1/2011 | Block et al. |
| 2011/0040655 A1 | 2/2011 | Hendrickson |
| 2011/0133892 A1 | 6/2011 | Nohr |
| 2011/0178960 A1 | 7/2011 | Dever et al. |
| 2011/0227726 A1 | 9/2011 | Lee |
| 2011/0307547 A1 | 12/2011 | Backer et al. |
| 2012/0013462 A1 | 1/2012 | Tuck et al. |
| 2012/0016745 A1 | 1/2012 | Hendrickson |
| 2012/0040751 A1 | 2/2012 | Peters |
| 2012/0116789 A1 | 5/2012 | Boss et al. |
| 2012/0116863 A1 | 5/2012 | Boss et al. |
| 2012/0136793 A1 | 5/2012 | Barber-Mingo et al. |
| 2012/0147169 A1 | 6/2012 | Harper et al. |
| 2012/0184367 A1 | 7/2012 | Parrott et al. |
| 2012/0197746 A1 | 8/2012 | Harris |
| 2012/0197949 A1 | 8/2012 | Taylor et al. |
| 2012/0223834 A1 | 9/2012 | Hyatt |
| 2012/0271834 A1 | 10/2012 | Canora et al. |
| 2012/0287281 A1 | 11/2012 | Williams et al. |
| 2012/0323646 A1 | 12/2012 | Dube et al. |
| 2012/0330740 A1 | 12/2012 | Pennington et al. |
| 2013/0018661 A1 | 1/2013 | Padgett et al. |
| 2013/0018684 A1 | 1/2013 | Padgett et al. |
| 2013/0041696 A1 | 2/2013 | Richard |
| 2013/0045804 A1 | 2/2013 | Ruke |
| 2013/0065679 A1 | 3/2013 | Gelman et al. |
| 2013/0066660 A1 | 3/2013 | Kopitzke et al. |
| 2013/0073325 A1 | 3/2013 | Ross |
| 2013/0090957 A1 | 4/2013 | Popkey et al. |
| 2013/0091146 A1 | 4/2013 | Stanger |
| 2013/0102248 A1 | 4/2013 | Jay et al. |
| 2013/0103519 A1 | 4/2013 | Kountotsis et al. |
| 2013/0124234 A1 | 5/2013 | Nilsson et al. |
| 2013/0146659 A1 | 6/2013 | Zhou et al. |
| 2013/0151296 A1 | 6/2013 | Waytena et al. |
| 2013/0165154 A1 | 6/2013 | Joshi |
| 2013/0204651 A1 | 8/2013 | Gulec et al. |
| 2013/0204656 A1 | 8/2013 | Mahfouda et al. |
| 2013/0218612 A1 | 8/2013 | Hunt |
| 2013/0254027 A1 | 9/2013 | Silverman et al. |
| 2013/0254137 A1 | 9/2013 | Hunt |
| 2013/0293720 A1 | 11/2013 | Tyson et al. |
| 2013/0332208 A1 | 12/2013 | Mehta |
| 2013/0332509 A1 | 12/2013 | Schwartz et al. |
| 2014/0006451 A1 | 1/2014 | Mullis et al. |
| 2014/0046802 A1 | 2/2014 | Hosein et al. |
| 2014/0074404 A1 | 3/2014 | Hassan |
| 2014/0074521 A1* | 3/2014 | Morioka ................ G06Q 10/02 705/5 |
| 2014/0074523 A1 | 3/2014 | Turner et al. |
| 2014/0089075 A1 | 3/2014 | Sanchis et al. |
| 2014/0108149 A1 | 4/2014 | Jabara et al. |
| 2014/0113707 A1 | 4/2014 | Asher et al. |
| 2014/0114807 A1 | 4/2014 | Baker et al. |
| 2014/0132400 A1 | 5/2014 | Heaven et al. |
| 2014/0136105 A1 | 5/2014 | Chakraborty et al. |
| 2014/0156290 A1 | 6/2014 | Kozicki et al. |
| 2014/0156319 A1 | 6/2014 | Deeb |
| 2014/0162693 A1 | 6/2014 | Wachter et al. |
| 2014/0235276 A1 | 8/2014 | Lefkowitz |
| 2014/0236653 A1 | 8/2014 | Farrell |
| 2014/0249866 A1 | 9/2014 | Popkey et al. |
| 2014/0249994 A1 | 9/2014 | Proud |
| 2014/0256421 A1 | 9/2014 | Bishop et al. |
| 2014/0256446 A1 | 9/2014 | Barney et al. |
| 2014/0257889 A1 | 9/2014 | Ashley, Jr. et al. |
| 2014/0278688 A1 | 9/2014 | Sullivan et al. |
| 2014/0324488 A1 | 10/2014 | Boccelli |

(56) References Cited

U.S. PATENT DOCUMENTS

| | | |
|---|---|---|
| 2014/0343976 A1 | 11/2014 | Ahluwalia et al. |
| 2014/0343977 A1 | 11/2014 | Macina |
| 2014/0343995 A1 | 11/2014 | Backer et al. |
| 2014/0364148 A1 | 12/2014 | Block et al. |
| 2014/0378233 A1 | 12/2014 | Weston et al. |
| 2015/0009116 A1 | 1/2015 | Mangold et al. |
| 2015/0025919 A1 | 1/2015 | West |
| 2015/0026008 A1 | 1/2015 | Werbitt |
| 2015/0046202 A1 | 2/2015 | Hunt |
| 2015/0058129 A1 | 2/2015 | Nevid et al. |
| 2015/0058324 A1 | 2/2015 | Kauwe |
| 2015/0080081 A1 | 3/2015 | Kessman et al. |
| 2015/0081348 A1 | 3/2015 | Avera et al. |
| 2015/0083803 A1 | 3/2015 | Herron et al. |
| 2015/0088562 A1 | 3/2015 | Woods |
| 2015/0088671 A1 | 3/2015 | Xiong et al. |
| 2015/0088782 A1 | 3/2015 | Zhang |
| 2015/0090242 A1 | 4/2015 | Weston et al. |
| 2015/0379434 A1 | 12/2015 | Argue et al. |
| 2017/0098337 A1 | 4/2017 | Galley et al. |

FOREIGN PATENT DOCUMENTS

| | | | |
|---|---|---|---|
| CN | 201607767 U | | 10/2010 |
| EP | 0958553 A1 | | 11/1999 |
| EP | 1 690 222 A2 | | 8/2006 |
| EP | 1 696 327 A1 | | 8/2006 |
| JP | H08194853 A | | 7/1996 |
| JP | 2002032800 A | | 1/2002 |
| JP | 2004178041 A | | 6/2004 |
| WO | WO 9718534 A1 | | 5/1997 |
| WO | WO 2003034350 A2 | | 4/2003 |
| WO | WO 2004047353 A2 | | 6/2004 |
| WO | WO 2005038612 A2 | | 4/2005 |
| WO | WO 2005038688 A1 | | 4/2005 |
| WO | WO 2005124699 A1 | | 12/2005 |
| WO | WO2007004047 A2 | | 1/2007 |
| WO | WO 2008128583 A1 | | 10/2008 |
| WO | WO 2008144283 A1 | | 11/2008 |
| WO | WO 2010089771 A2 | | 8/2010 |
| WO | 2014041738 A1 | | 3/2014 |

OTHER PUBLICATIONS

International Search Report and Written Opinion in corresponding PCT Application No. PCT/US2015/045897 dated Nov. 11, 2015 (11 pages).

International Search Report and Written Opinion in corresponding PCT Application No. PCT/US2013/044785 dated Apr. 30, 2014 (15 pages).

JP 2017-510342 Office Action dated Jun. 20, 2019.

JP Japanese Office Action Application No. 2022-101699 dated Aug. 31, 2023.

* cited by examiner

VIRTUAL QUEUING SYSTEM AND METHOD

CROSS-REFERENCE TO RELATED APPLICATIONS

The present application is a continuation of U.S. application Ser. No. 14/829,227, filed on Aug. 18, 2015, which claims the benefit of U.S. Provisional Application No. 62/039,609, entitled "Virtual Queuing System and Method" and filed Aug. 20, 2014, the disclosures of which are incorporated herein by reference for all purposes.

BACKGROUND

The present disclosure relates generally to the field of amusement parks. More specifically, embodiments of the present disclosure relate to methods and equipment utilized to manage amusement park experiences, including queuing for attractions.

Since the early twentieth century, amusement parks have substantially grown in popularity. In order to address this increasing demand, amusement parks have been expanding by adding attractions and space. The addition of attractions (e.g., rides, restaurants, shops, and shows) generally provides an amusement park with additional capacity to handle a larger number of guests. However, the additional attractions also typically provide potential guests with an incentive to visit the amusement park. Thus, while a particular amusement park may add additional capacity, the additional capacity does not always result in an increased ability for guests to participate in park entertainment (e.g., shopping, viewing shows, riding rides) or reduced wait times for attractions. This is because there is often a corresponding increase in attendance. Further, due to operating efficiencies, it is often desirable to limit the availability of attractions during low attendance times. Thus, queuing for attractions, which may limit participation in park activities, is a perennial issue for amusement parks.

While guests have demanded bigger, better, and more elaborate attractions, they also require and expect a positive overall experience. Providing a positive overall experience for amusement park guests entails addressing certain issues related to queuing for attractions. Indeed, it is now recognized that park guests can be deterred from returning to a particular amusement park due to negative experiences with queue waiting times. Further, guests may be prevented from accessing amusement park businesses (e.g., shops) due to time spent waiting in queues. Indeed, in the past, guests have been forced to wait hours in line to experience some of the more popular attractions at an amusement park. Additionally, it is now recognized that park capacity does not always equal guest utilization of that capacity due to individual guest preferences for certain attractions over others. Accordingly, it is now recognized that it is desirable to improve amusement park queuing systems and methods.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a virtual queue system is provided. The virtual queue system includes at least one virtual queuing station associated with an individual attraction within a theme park. The virtual queue system also includes a transceiver of the at least one virtual queuing station, wherein the transceiver is configured to receive a wireless signal from a guest-associated device, wherein the wireless signal comprises identification information for a guest associated with a guest device. The virtual queue system also includes a virtual queue control system in communication with the at least one virtual queuing station and the active wearable, wherein the virtual queue control system is configured to receive a communication comprising the identification information from the at least one virtual queuing station and wherein receiving the communication causes the virtual queue control system to add the wearer to a virtual queue for the individual attraction and to send a confirmation message to one or both of the at least one virtual queuing station or to the guest device that the guest has been added to the virtual queue.

In accordance with another embodiment, a virtual queue system is provided. The virtual queue system includes a plurality of virtual queuing stations associated with respective attractions within a theme park; and a virtual queue control system configured to maintain respective virtual queues for the respective attractions and in communication with the plurality of virtual queuing stations, wherein the virtual queue control system is configured to receive communications from the plurality of virtual queuing stations and add guests to the respective virtual queues based on the communications.

In accordance with another embodiment, a method is provided. The method includes the steps of providing a wireless signal using communication circuitry of an active wearable to a virtual queuing station associated with an individual attraction within a theme park, wherein the wireless signal comprises identification information for a guest associated with a guest device; receiving a confirmation message via the communications circuitry confirming being added to a virtual queue of the individual attraction; and receiving a status message via the communications circuitry related to a position in the virtual queue.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Presently disclosed embodiments facilitate virtual queuing within a theme park. A virtual queue control system as provided herein manages queuing for various attractions with the theme park to minimize or eliminate guest time spent waiting in a physical queue. In certain embodiments, a given attraction has a single virtual queue that is dynamically managed by the control system to add or remove guests, update positions in the queue, and send messages to the guests related to their queue positions. The system receives various inputs from the attractions and/or guests that are used to dynamically manage the various queues. In certain embodiments, queuing is mediated via guest devices such as active wearables (e.g., bracelets, wearable tags, necklaces or badges, etc.) that are carried by or associated with the guests and that interact with various kiosks or check-in points to permit guest to enter attraction queues. In this manner, park guests may enjoy the park without carrying paper tickets, identification, or other credentials. For example, guests at a water park may not wish to manage paper tickets that can get wet. Further, because guests wearing bathing suits have limited ability to carry identification items or handheld devices, active wearables that are compatible with water activities (e.g., waterproof) may be a more convenient way to manage queue information than a mobile device.

Figure 1:
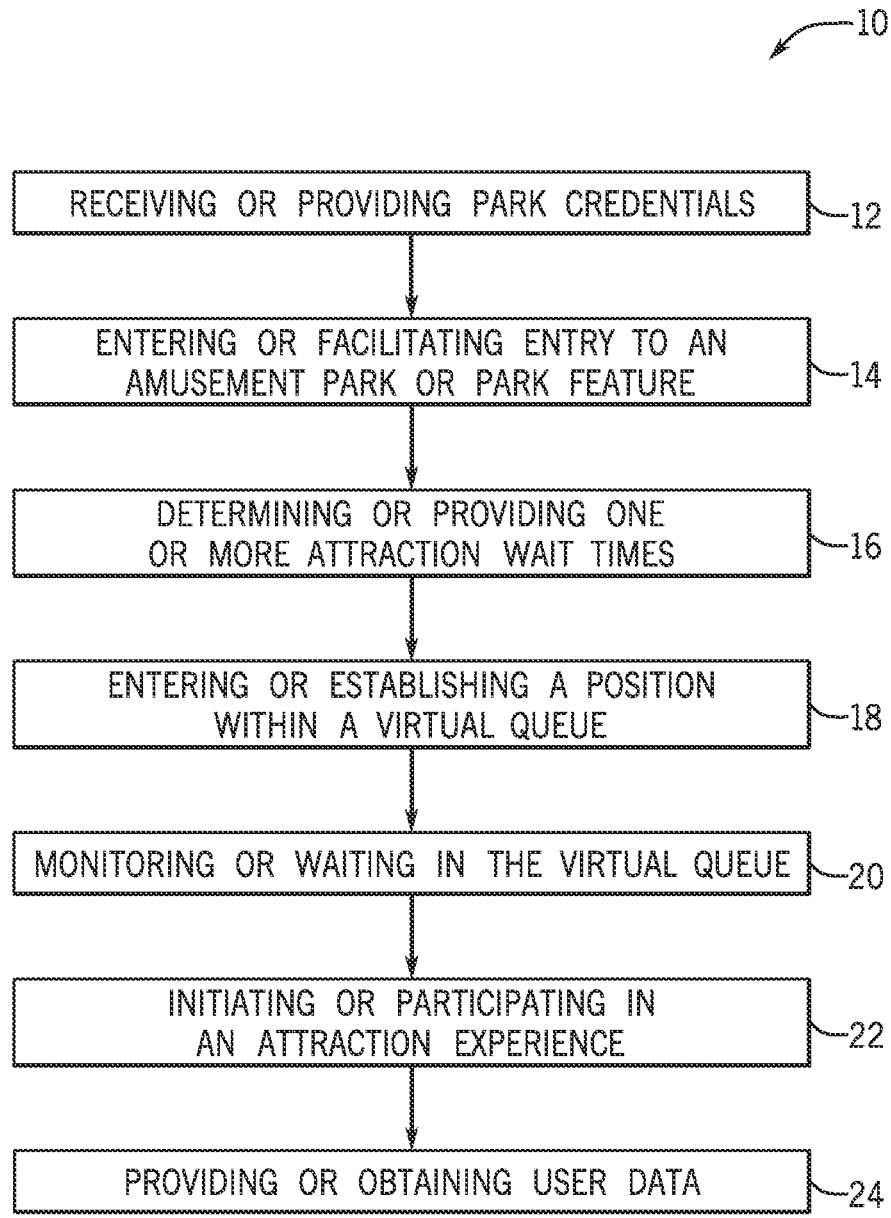
FIG. 1 is a flow diagram of a method using a virtual queue system in accordance with present techniques.

FIG. 1 is a flow diagram of a method 10 of virtual queue management in accordance with present embodiments. The method 10 includes receiving or providing park credentials (block 12), entering or facilitating entry to an amusement park or park feature (block 14), determining or providing one or more attraction wait times (block 16), entering or establishing a position within a virtual queue (block 18), monitoring or waiting in the virtual queue (block 20), initiating or participating in an attraction experience (block 22), and providing or obtaining user data (block 24). Details of the aspects of the method 10 will be discussed in further detail below with respect to related system features.

Figure 2:
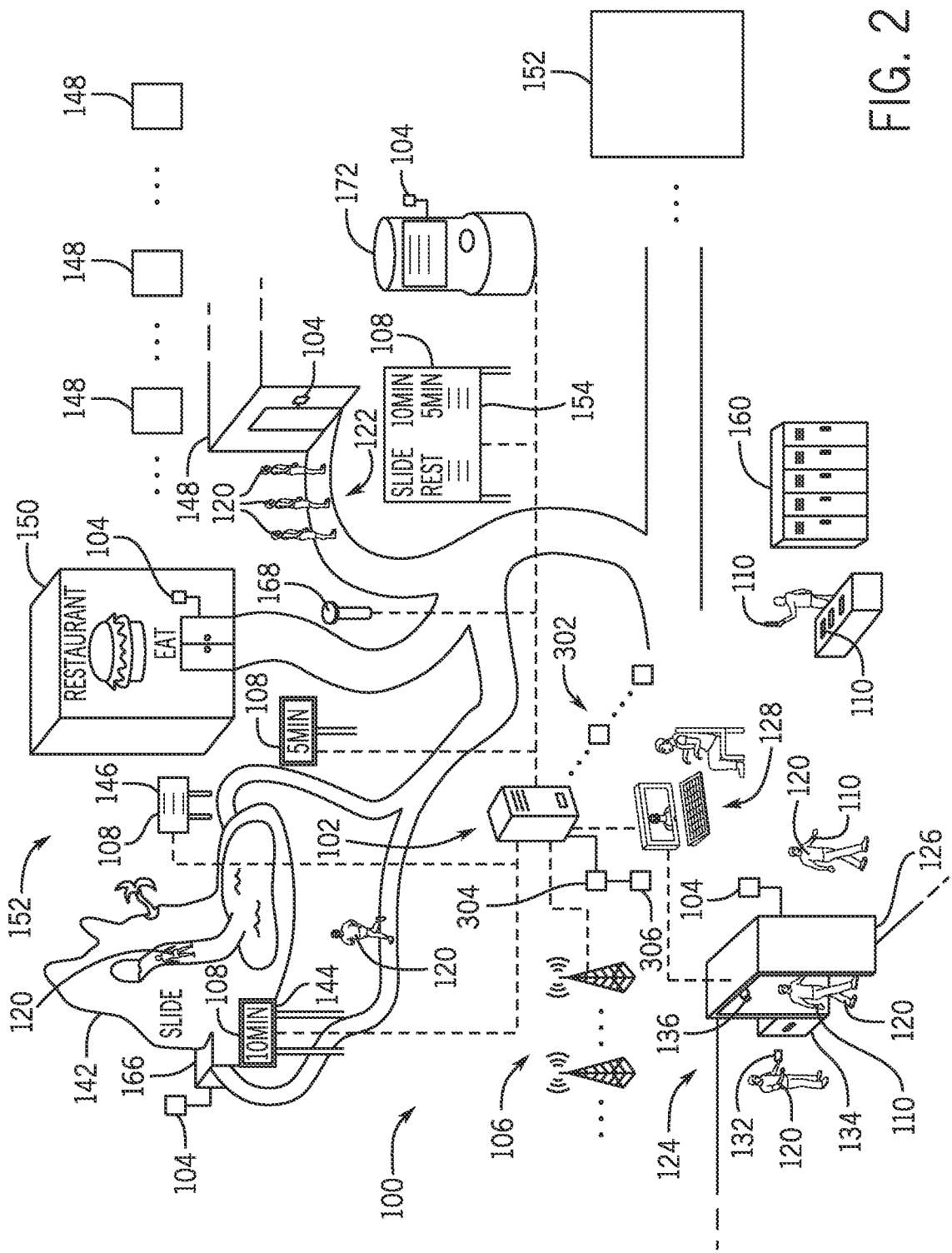
FIG. 2 is a schematic view of a theme park including a virtual queue system in accordance with present techniques.

FIG. 2 is a schematic representation of a system 100 for facilitating queuing in accordance with present embodiments. The system 100 includes a computer system 102, monitoring sensors 104, a wireless communication system 106, system displays 108, active wearables 110 (e.g., a bracelet including accessible data and communication features) and other components that coordinate in accordance with present embodiments, as will be described in detail below. Certain aspects of the system 100 will be referenced with respect to the part they play in the method 10 illustrated by FIG. 1. Specifically, it should be noted that present embodiments facilitate virtual queuing such that amusement park guests 120 can obtain a position within a virtual queue and subsequently enter a physical queue or standby loading group 122 of limited length. Present embodiments may function to limit time spent by guests 120 in physically waiting 122 and encourage participation in other areas of an amusement park, such as dining, shopping, and other entertainment venues (e.g., rides, shows).

As generally represented by block 12 of method 10, when guests 120 arrive at a ticketing location 124 (e.g., hotel front desk, kiosk, guest service counter, park gate), the guests 120 may be provided with entry credentials (e.g., tickets or active wearables 110) among other items, such as a park map, virtual queuing instructions, and amenities instructions. Informational media (e.g., audio, video) and instructional signage may be present at all such ticketing locations 124. In some instances, guests 120 may have obtained entry credentials prior to arrival and may skip acquiring such credentials at the ticketing location 124.

As generally represented in block 14 of method 10, guests may enter and be provided entry into the park or a park area via an entryway 126. Specifically, as illustrated in FIG. 1, the entryway 126 may exclude a physical turnstile or similar physical traversal counting or control features that can provide an impediment to traversal of the entryway 126 when the entryway 126 is intended to be open. That is, the entryway 126 may be turnstile-less during operation. If guests 120 already have their entry credentials or an identification code or number transferred into an active wearable ("AW") 110, the guests 120 may be provided essentially direct access to the park or park area. For example, guests 120 with properly activated AWs 110 may be allowed to walk through the entryway 126 without stopping. The credentials associated with the AW 110 being held or worn by the guests 120 will be detected and provided to a gate monitoring facility 128 that may be monitored by a park employee (e.g., a security service company). For example, this may include providing a photograph of the guest 120 (e.g., a photograph of the guest's face) passing through the entryway 126. Thus, the photograph may be used for entry privilege confirmation. In other embodiments, other features may be used, such as fingerprints or other identifying aspects (e.g., facial recognition). While certain embodiments of the disclosure are illustrated in conjunction with an AW 110, it should be understood that the disclosed techniques may be implemented with guest-associated devices that are configured to wirelessly communicate guest information, such as pocket-carried devices, handheld devices, or mobile devices. In particular embodiments, the guest-associated devices are waterproof.

Also, as generally represented by block 14 of method 10, if guests 120 do not have their AW 110 with them or if their AW 110 is not properly activated, they may insert ticket media 132 into a scanner 134, which facilitates transfer of information to the gate monitoring facility 128, which may include any of a number of gate monitoring systems, and informs a park employee that the guest 120 is authorized to enter the park or park area. If authorization is granted in this manner, an AW 110 may be distributed to them and a photograph of the guest's face automatically taken. For example, a photograph may be automatically taken by a camera 136 positioned proximate the entryway 126. The same camera 136 may be used for monitoring purposes as well. In other embodiments, the picture of guests 120 acquiring their AW 110 may occur in a different location. Further, in some embodiments, the guests 120 may acquire their AW 110 after progressing through the entryway 126 (as in the illustrated embodiment of FIG. 2) or prior to progressing through the entryway 126.

As generally represented by block 16 of method 10, wait times may be ascertained by guests by viewing displays provided at numerous locations throughout the park or park area. At the entrance of certain or all attractions, displays 108 provide the wait time for the specific attraction. For example, the water slide 142 includes a display 144 that specifically provides a wait time for that attraction. The information for each display may be provided based on information obtained by tracking AWs 110 or otherwise monitoring park areas (e.g., ride exits and entrances) with monitoring sensors 104. Further, at the exit of certain or all attractions, a display may be provided to indicate the wait times for all attractions (e.g., all attractions in the park or park area). For example, the exit area of the water slide 142 includes a display 146 that may provide wait times for all of the surrounding attractions (e.g., rides 148). The display 146 may even provide wait times for non-ride attractions, such as a wait time for a restaurant 150. The display 146 may be limited to display of wait times for attractions within a particular park area 152 (e.g., a park "village"). Also, within each park area 152, one or more wait time boards 154 (e.g., centrally located displays 108) may indicate wait times for all park attractions or attractions within the park area 152.

Further still, before guests 120 place their portable devices (e.g., mobile phones) into lockers 160, mobile applications may be used via the mobile devices to ascertain wait times.

Block 18 generally represents entering or establishing a position within a virtual queue. In one embodiment, the guest 120 enters the queue by walking to the attraction entry and walking through an entry portal. For example, the guest 120 may walk to the water slide 142 and walk through its entry portal 166. Once the guest 120 walks through the portal 166, the guest's AW 110 will notify him/her (via a tone, vibration, illuminator) of being added to the virtual queue. This may be achieved by detecting the AW 110 with the monitoring sensor 104 at the entry portal 166 and via aspects of the AW 110, which will be discussed further below. In another embodiment, the guest 120 may enter the virtual queue by walking to a queue entry post 168, which may indicate the name of the attraction and current wait time, and engaging the post 168 with the AW 110. This may include tapping the AW 110 against or positioning it near the post 168. The posts 168 may be located at the exit or entry of each attraction and at a central location within each park area 152 or village. In one embodiment, an individual post 168 may be associated with only one attraction such that engaging with the post 168 automatically enters the guest 120 in the virtual queue of the associated attraction, e.g., the virtual queue is entered without any guest selection between different attractions at the post 168, and tapping or engaging the post is the selection step for selecting the associated attraction.

Once the guest engages the queue entry post 168, the guest's AW 110 will notify the guest (e.g., via a tone, vibration, illuminator) of being added to the virtual queue. For example, the AW 110 may receive a signal to cause the displayed information on the AW 110 to change. Further, the post 168 may additionally or alternatively provide a notification of successful addition to the queue. The notification may be generated and/or communicated by a central virtual queue control system to the AW 110. In another embodiment, the notification is generated and/or communicated by the queue entry post 168. In yet another embodiment, the guest 120 may enter the virtual queue by walking to a queue kiosk 172 (e.g., a single device that displays the names and wait times for all virtual queuing attractions in the park or park area). Queue kiosks 172 may be located at the entry or exit of each attraction and in a central location within each park area 152. The guest 120 selects the queue he/she wishes to enter and engages (e.g., taps) the kiosk with his/her AW 110. Once the guest 120 engages the queue kiosk 172, the guest's AW 110 will notify the guest 120 (e.g., via a tone, vibration, illuminator) of being added to the virtual queue. For example, the AW 110 may receive a signal to cause the displayed information on the AW 110 to change. Further, the kiosk 172 may additionally or alternatively provide a notification of successful addition to the queue.

In another embodiment, the guest 120 must physically go the area of a particular attraction and engage with the designated queue entry post 168 for that attraction to enter the queue. That is, virtual queue entry is mediated only via the designated queue entry post (or posts) 168 that are physically co-located with the attraction. In this manner, the guest is encouraged to see an individual ride 148 and determine if the ride is of interest before entering the ride virtual queue. The central queue controller receives the communication form the post 168 or kiosk 172 and adds the guest to the appropriate virtual queue. The addition may be based on a time stamp or a counter. For example, for attractions that have multiple tap-in posts 168, the guests may be added based on the individual time stamp of the tap-in event and on a first-in basis.

In each of the embodiments discussed above, the guest's AW 110 may display the estimated return time. For example, a display on the AW 110 may provide a time (e.g., 5:02 PM) by which the guest should return to enter a loading group 122. This time may dynamically change depending on the operational factors (e.g., current ride capacity, other guests leaving the queue, guests with express (e.g., credentials to automatically jump to the front of a physical and/or virtual queue) or very important person (VIP) credentials entering the queue, inclement weather, and/or downtimes). In some embodiments, once the guest 120 has entered a virtual queue (or some limited number of virtual queues), the guest 120 can no longer enter any other virtual queue unless he/she leaves the current virtual queue, either by entering the ride or by entering a different virtual queue. For example, in one embodiment, engaging the post 168 of a ride or attraction overrides any previously existing places in a virtual queue. In this manner, the guest 120 may traverse the park and, upon noting a ride that is of greater interest or that has a shorter wait time, may simply swipe the AW 110 to enter into a new virtual queue and be automatically removed from a previous virtual queue with one action, which permits the guest 120 to minimize engagement with queue devices and enjoy the park experience.

Further, if more than one virtual queue can be entered, the difference between wait times for the available virtual queues may be set to be a sufficient time for both to be entered taking into consideration variables such as travel time between. The system may also artificially space multiple virtual queues to optimize the patrons' day and transit time. In one embodiment, if there is no penalty for failure to arrive at a queued attraction, aside from not being able to enter additional queues, the system may permit close-together times but may also account for a certain predicted percentage of no-shows. In another embodiment, the virtual queuing system may only be in effect if the wait time for the current attraction is greater than 10 minutes. In another embodiment, the guest 120 may be permitted to enter two virtual queues at the same time, but may only enter a single virtual queue at a time that is associated with a ride designated as a low capacity ride. For example, certain park rides may have relatively low capacity and, therefore, may develop longer virtual queues than higher capacity rides, which are capable of moving a greater number of guests through the ride in a given period of time. To control the virtual queue length of lower capacity rides, the virtual queue system as provided herein may, in certain embodiments, prevent the guest 120 from entering two low capacity ride virtual queues simultaneously. For example, when the guest 120 is already entered in a low capacity queue, engaging with the designated post 168 of a second low capacity ride may trigger a warning message displayed on a display of the post 168, e.g., "GUESTS IN LINE FOR DINOSAUR ADVENTURE MAY NOT ENTER THE LINE FOR VOLCANO RUSH. WOULD YOU LIKE TO EXIT THE LINE FOR DINOSAUR ADVENTURE TO JOIN THE LINE FOR VOLCANO RUSH?" The post 168 may then receive a guest selection of YES or NO. If the guest 120 selects no, the engagement with the post 168 of the second low capacity ride is ended. If the guest 120 selects YES, the guest 120 is added to the virtual queue of the second low capacity ride and automatically removed from the virtual queue of the first low capacity ride.

As generally represented by block 20 of method 10, present embodiments facilitate monitoring or waiting in the virtual queue. Guests 120 may wait in the virtual queue by experiencing instantaneous capacity attractions (e.g., a wave pool, swimming pool, splash pad, lazy river, a ride with no wait time), visiting food, beverage, or merchandising locations, or simply relaxing (e.g., resting in a lounge chair). If an attraction wait time of a virtual queue changes, this information may be provided via the communication system 106 to the AW 110, which will notify the wearing guest 120 and display the updated wait time. If a guest 120 wishes to leave a current virtual queue for another virtual queue, he/she can do so by just joining a new virtual queue as set forth in the description of the various embodiments above. If a guest leaves the park (or, in some cases, a park area) while waiting in a virtual queue, he/she is automatically removed from any virtual queues he/she is currently in. Present embodiments may establish no geographical limits within the park while waiting in a virtual queue and guests 120 may be free to go to any location and perform any task within the park.

As generally represented by block 22 of method 10, present embodiments encourage initiating and participating in attraction experiences. In some embodiments, the virtual queuing system 100 will notify the guest 120 prior to the guest's ride time. To determine the amount of prior notification time, the system 100 will utilize multiple factors to optimize capacity: current wait time at the attraction, current distance of the guest 120 away from the attraction, the guest's current activity, and the guest's history for arrival speeds from previous virtual queues. Once the guest is notified, the guest 120 travels to the attraction entrance and walks to the load platform, which accommodates the limited standby group 122. These factors or variables are monitored by the computer system 102 (e.g., a network of computers 302), which includes at least one processor 304 and at least one memory 306, via communication with the monitoring sensors 104. To ensure that the attraction throughput is not starved, a small standby group 122 (less than 10 minutes) may be formed prior to the load platform at each attraction. Once a guest reaches the load platform and enters the ride, he/she is removed from the current virtual queue. After experiencing the attraction, guests 120 can join another virtual queue as described above (e.g., a post, kiosk, or the like located in the exit path of the attraction).

As generally represented by block 24 of method 10, present embodiments also facilitate communication and management of additional data related to park management. For example, the AW 110 may also perform functions other than facilitating queue access. Specifically, the AW 110 may operate as an identification device used for cashless purchases and for validation to access controlled areas. In some embodiments, guest photographs are automatically taken while on each attraction, as triggered by the AW 110. Such photographs can be purchased by the guest 120 via an Internet portal (e.g., website, app, kiosk). Further, information may be automatically logged by the virtual queuing system 100 for data analysis. This information may include: experienced attractions (including count and order of visit), wait time for each attraction, time it takes for the guest to return to the attraction once notified, entry time into the park, exit time out of the park, amount of money spent via cashless system.

Figure 3:
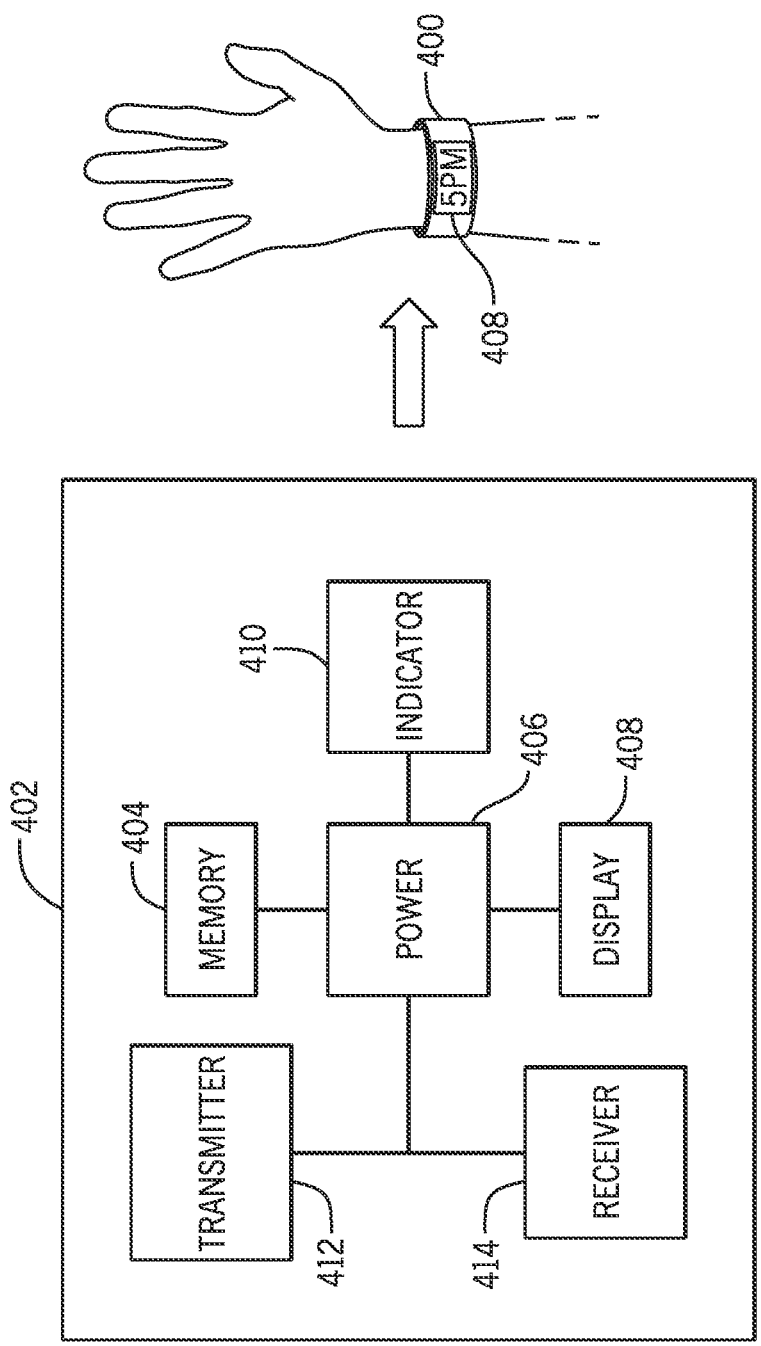
FIG. 3 is a block diagram of an active wearable in accordance with present techniques.

FIG. 3 is a schematic representation of an AW 110 in accordance with present embodiments. In the illustrated embodiment, the AW 110 includes a housing 400 in the form of a bracelet. However, in other embodiments, it may include a necklace, a headband, a ring, or other conveniently wearable item. A device 402 may be imbedded in the housing 400. The device 402 may include several separate or unified components that perform certain functions. In the illustrated embodiment, the device 402 includes a memory/identifier 404, a power module 406, a display 408, an indicator 410, a transmitter 412, and a receiver 414. In some embodiments, these features may be limited. For example, the display 408 and the transmitter 412 may be excluded. In some embodiments, the memory/identifier 404 may include a simple identifier (e.g., an RFID tag), which the system 100 associates with a guest 120. In operation, the device 402 may operate to at least receive information from the system 100 to provide the user with information (e.g., a return time for a ride). Further, an indicator (e.g., a light, a vibration mechanism, or an audio feature) may provide feedback to the guest 120. Specifically, the device 402 may communicate with the system 100 via the communication system 106. In some embodiments, this may include communication from the device 402 to the system 100. However, in other embodiments, detecting the device 402 throughout the park area using the monitoring sensors 104 and analyzing such data with the system 100 may provide information related to the device 402 (e.g., wait times experienced by the user 120 associated with the device 402). In some embodiments, the AW 110 may be essentially passive and indications (e.g., confirmation sounds) may be provided by the system 100 (e.g., a speaker announcing a nickname of the wearer being entered into a particular virtual queue).

Figure 4:
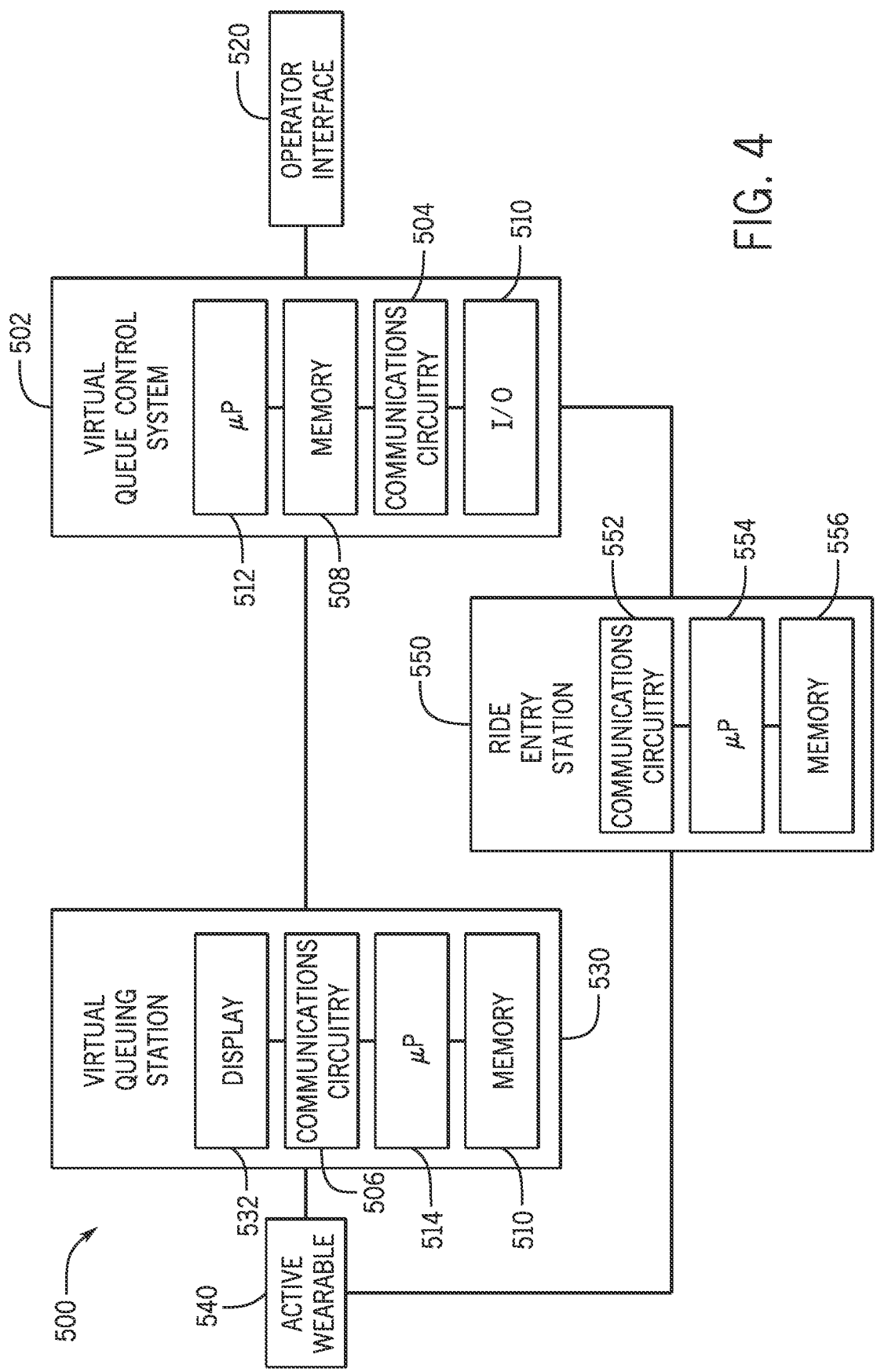
FIG. 4 is a block diagram of a virtual queue system in accordance with present techniques.

FIG. 4 is a block diagram of a virtual queue system 500 that may be implemented to manage queues in a theme park. The system 500 includes a virtual queue control system 502 in communication with one or more virtual queuing stations 530. The virtual queuing stations 530 may be implemented as portals or posts (e.g., portal 166 or post 168, see FIG. 2), kiosks, or the like. Each park ride or attraction may be associated with one or more dedicated virtual queuing stations 530 that receive queue inputs from guests. That is, in certain embodiments, each virtual queuing station 530 may facilitate entry into the virtual queue of only one attraction. One or both of the virtual queue control system 502 and an individual virtual queuing station 530 may include communications circuitry (e.g., communications circuitry 504 or 506), such as antennas, radio transceiver circuits, and signal processing hardware and/or software (e.g., hardware or software filters, A/D converters, multiplexers amplifiers), or a combination thereof, and that may be configured to communicate over wired or wireless communication paths via IR wireless communication, satellite communication, broadcast radio, Microwave radio, Bluetooth, Zigbee, Wifi, UHF, NFC, etc. Such communication may also include intermediate communications devices, such as radio towers. In one embodiment, the communication between the virtual queuing station 530 and the virtual queue control system 502 is wired.

In addition, one or both of the virtual queue control system 502 and an individual virtual queuing station 530 may include a memory device (e.g., memory device 508 or 510) for storing instructions executable by a processor (e.g., processor 512 or 514) to perform the methods and control actions described herein. For example, the processor 512 may execute instructions for dynamic virtual queue management based on inputs from the virtual queuing stations 530 as well as data on guest entry into a ride and guest exit from a park. Additional inputs to dynamic queue management may include guest location within the park. For example, a reminder to return to the attraction may be based at least in part on the guest's location relative to the attraction, as determined via wireless signal or global positioning system (GPS) information from the guest active wearable or by a guest's last tap-in location with the virtual queuing station or other tap-in device. The system 500 may store guest locations during a park visit to create an accessible log of guest locations within the park for use in predicting guest current and future locations. If the guest is estimated to be located within a first distance or within a first zone relative to the attraction, the return reminder or message is sent within to return within a first time (e.g., "20 MINUTES UNTIL VOLCANO RUSH"), which accounts for a shorter travel time to the attraction. If the guest is instead in a farther second zone or a farther estimated second distance, the return reminder or message accounts for the longer travel time by providing an earlier return time (e.g., "5 MINUTES UNTIL VOLCANO RUSH"), to account for longer walking times to the attraction. In this manner, guests at similar positions in the virtual queue but at different locations within the park are estimated to return to the attraction within the same approximate time window.

The processor may include one or more processing devices, and the memory may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor or by other processor-based devices (e.g., mobile devices). For example, the virtual queue control system 502 or an individual virtual queuing station 530 may include may be accessed by an operator interface 520, e.g., a computer-based workstation or a mobile device, and/or may include an input/output interface 510 and a display (e.g., display 532).

The virtual queuing station 530 receives signals (e.g., wireless signals, such a RF signals) from a guest AW 540. The AW 540 may, in one embodiment, tap in to the virtual queuing station (e.g., via a hand wave or via positioning the AW 540 within the reading zone of the virtual queuing station 530) where it send the signal via NFC and receives signal back and updates via NFC. Additionally, components of the system (e.g., the virtual queuing station 540 and/or the AW 540) may be actively listening for a wireless broadcast and may update the display upon receipt of the appropriate broadcast. Another option is a system where the virtual queuing station 530 are dumb/passive and the AW 540 reads the totem location and transmits the request through a wireless network bypassing the need to have the virtual queuing station 530 or ride entry/exit stations read the AW 540. These signals may, in turn, be communicated to the virtual queue control system 502 to add the guest associated with the AW 540 to the virtual queue. While the virtual queuing station 530 facilitates guest entry into a virtual queue, the virtual queue system 500 may also include ride entry stations 550. An individual ride entry station 550 may be implemented as an automatic gate or reader such that the AW 540 as it passes through the ride entry station 550 is automatically read and the guest associated with the AW 540 is indicated as entering the ride and, therefore, is automatically removed from the virtual queue. An individual ride entry station 550 may include communications circuitry 550, a processor 554, and a memory device 556 as provided herein. It should be understood that certain features of the virtual queue control system 502 may additionally or alternatively be implemented locally at the virtual queuing station 530 or the ride entry station 550.

The virtual queue system 500 may, in certain embodiments, manage a total guest experience to ensure that an individual guest may experience a minimum number of rides or experiences per day. For example, based on the virtual queue load for various attractions, the virtual queue system 500 may permit entry into a predetermined number of queues at the beginning of the day. Alternatively, the virtual queue system 500 may dynamically present ride options to each guest at a central kiosk (e.g., queue kiosk 172, see FIG. 2). That is, while in certain embodiments, the virtual queue control system is implemented without any central queue kiosk that permits selection and virtual queue entry to multiple queues of different attractions at a single device and within a single interaction, in other embodiments one or more central kiosks may mediate entry into multiple virtual queues at once.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. A virtual queue system, comprising:
 a wearable device comprising a communicator, wherein the communicator is configured to transmit a wireless signal comprising identification information associated with the wearable device;
 at least one queuing post associated with an attraction within a theme park;
 a transceiver of the at least one queuing post configured to receive the wireless signal from the wearable device that includes the identification information associated with the wearable device and to receive a second wireless signal from communication circuitry of a second wearable device at the at least one queuing post, wherein the second wireless signal comprises second identification information for a second guest associated with the second wearable device;
 a camera of the attraction; and
 a control system storing instructions that, when executed, cause the control system to:
  receive an indication from the attraction that the wearable device has entered the attraction based on the wireless signal being read by a sensor of the attraction; and
  trigger the camera to take a photograph of a guest associated with the wearable device based on receiving the indication; and
  not add the second guest to the queue for the attraction based on determining that the second guest is already in virtual queues for other low-capacity attractions.

2. The virtual queue system of claim 1, wherein the control system is configured to send the photograph to a kiosk, and receive a user input related to the photograph at the kiosk.

3. The virtual queue system of claim 1, comprising a second camera of an entryway and a detector of the entryway, wherein the detector reads the wireless signal from the wearable device as the wearable device passes through the entryway.

4. The virtual queue system of claim 3, wherein the second camera captures a second photograph of a guest passing through the entryway and sends the second photograph and the identification information associated with the wearable device to the control system.

5. The virtual queue system of claim 4, wherein the control system determines that the second photograph corresponds to entry credentials of the guest.

6. The virtual queue system of claim 1, wherein the wearable device is a mobile device.

7. The virtual queue system of claim 1, wherein the wearable device is a bracelet.

8. The virtual queue system of claim 1, wherein the sensor is a radio-frequency identification reader.

9. A method, comprising:
receiving a first wireless signal from communication circuitry of a first wearable device at a virtual queuing station associated with an individual attraction within a theme park, wherein the first wireless signal comprises first identification information for a first guest associated with the first wearable device;
sending a confirmation message to the communication circuitry confirming being added to a virtual queue of the individual attraction, wherein the confirmation message causes activation of an indicator on the first wearable device;
receiving a second wireless signal from the communication circuitry of the first wearable device using a first monitoring sensor at an attraction entrance of the individual attraction;
triggering a camera to capture a photograph of the guest based on receiving the second wireless signal;
receiving a third wireless signal from communication circuitry of a second wearable device at the virtual queuing station, wherein the third wireless signal comprises second identification information for a second guest associated with the second wearable device; and
not adding the second guest to the queue for the attraction based on determining that the second guest is already in virtual queues for other low-capacity attractions.

10. The method of claim 9, comprising accessing a stored photograph associated with the identification information responsive to receiving the second wireless signal; and validating the guest based on a comparison of the photograph and the stored photograph.

11. The method of claim 9, comprising validating the guest based on features of the photograph.

12. The method of claim 9, comprising validating the guest to the individual attraction based on a position in the virtual queue of the wearable device.

13. The virtual queue system of claim 3, wherein the control system is configured to transmit instructions to the wearable device responsive to the detector detecting the wearable device passing through the entryway to cause the wearable device to generate a visible or audible indication.

* * * * *